Nov. 5, 1940.                R. BURCKES                2,220,705
                             LAWN MOWER
                     Filed Sept. 22, 1938          3 Sheets-Sheet 1

INVENTOR
RICHARD BURCKES
BY
ATTORNEY

Nov. 5, 1940.    R. BURCKES    2,220,705
LAWN MOWER
Filed Sept. 22, 1938    3 Sheets-Sheet 2

INVENTOR
RICHARD BURCKES
BY
AHGolden
ATTORNEY

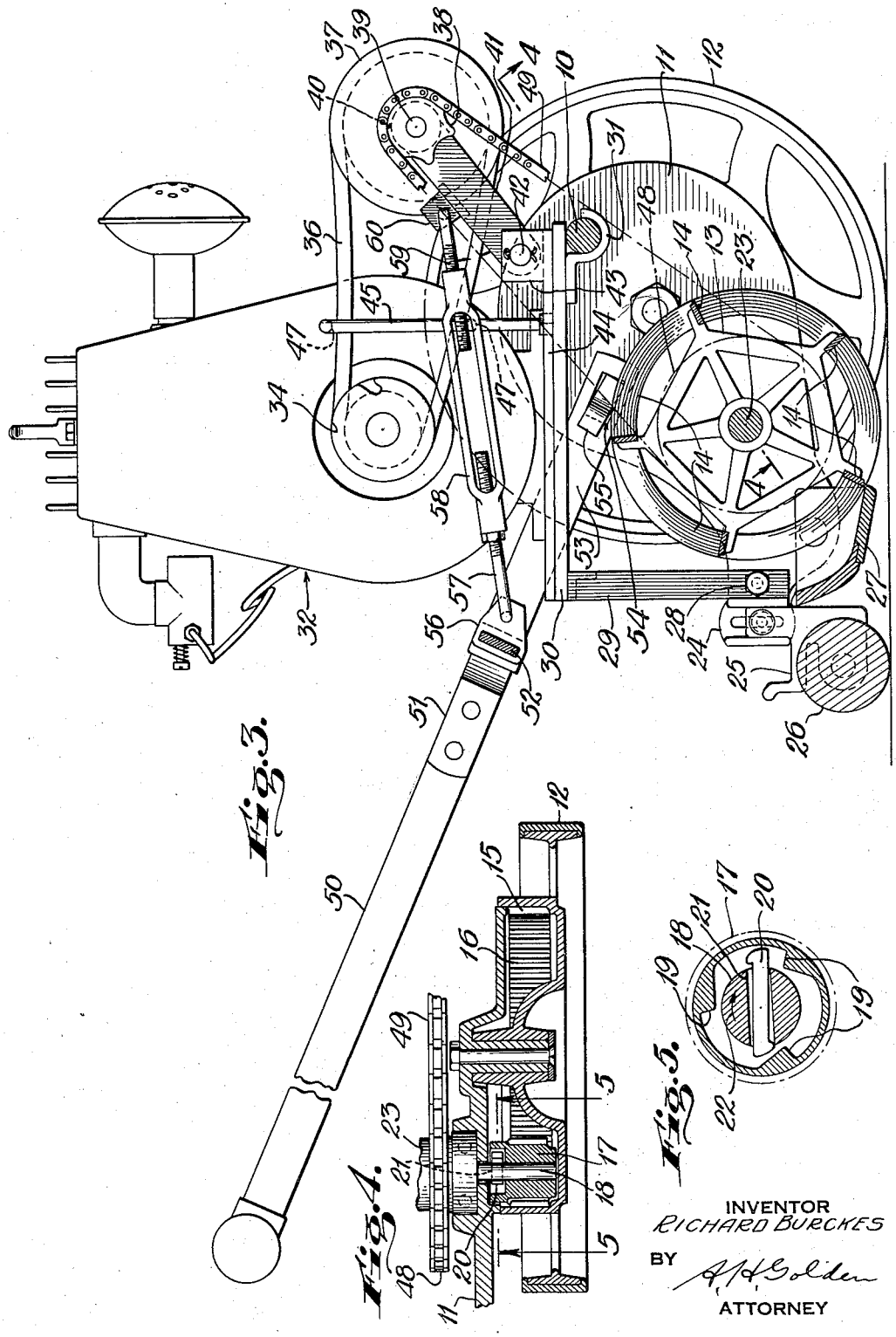

Patented Nov. 5, 1940

2,220,705

UNITED STATES PATENT OFFICE 2,220,705

LAWN MOWER

Richard Burckes, Sudbury, Mass.

Application September 22, 1938, Serial No. 231,220

2 Claims. (Cl. 56—26)

This invention relates to a power driven lawn mower, more especially to a mower adapted to be driven by a small internal combustion engine.

I appreciate that power lawn mowers are very old and well known in the art. However, I have devised a power lawn mower which may be manufactured most economically utilizing the standard parts and construction of existing commercial hand operated lawn mowers.

Because my power lawn mower uses the parts of a standard commercial hand operated lawn mower, it will be appreciated that it can be manufactured very cheaply by any manufacturer of hand lawn mowers, its manufacture requiring no retooling of production tools or changing of present commercial parts. Moreover, it will be appreciated that the parts of my lawn mower having been used in hand operated lawn mowers, are tested by time and experience, and are more apt to give fine service than newly designed equipment.

As a feature of my invention, the power apparatus may be of a standard commercial type now being manufactured in large quantities, and may be applied to a standard hand power lawn mower in a simple manner and without expensive or complicated controls. As a matter of fact, my lawn mower utilizes as its main control nothing more than the standard handle well known by all who have used hand operated lawn mowers. In addition, through my invention, I am able to obtain a gradual application of power so that my lawn mower will start and stop smoothly in a most desirable manner.

Having thus described generally the construction and main features of my invention I shall describe with reference to the accompanying drawings, a preferred form of my invention. It should be understood, however, that while I show a preferred and specific form of my invention, I do not wish to be limited in the monopoly to be granted me except as may be required by the state of the art.

Figure 1:
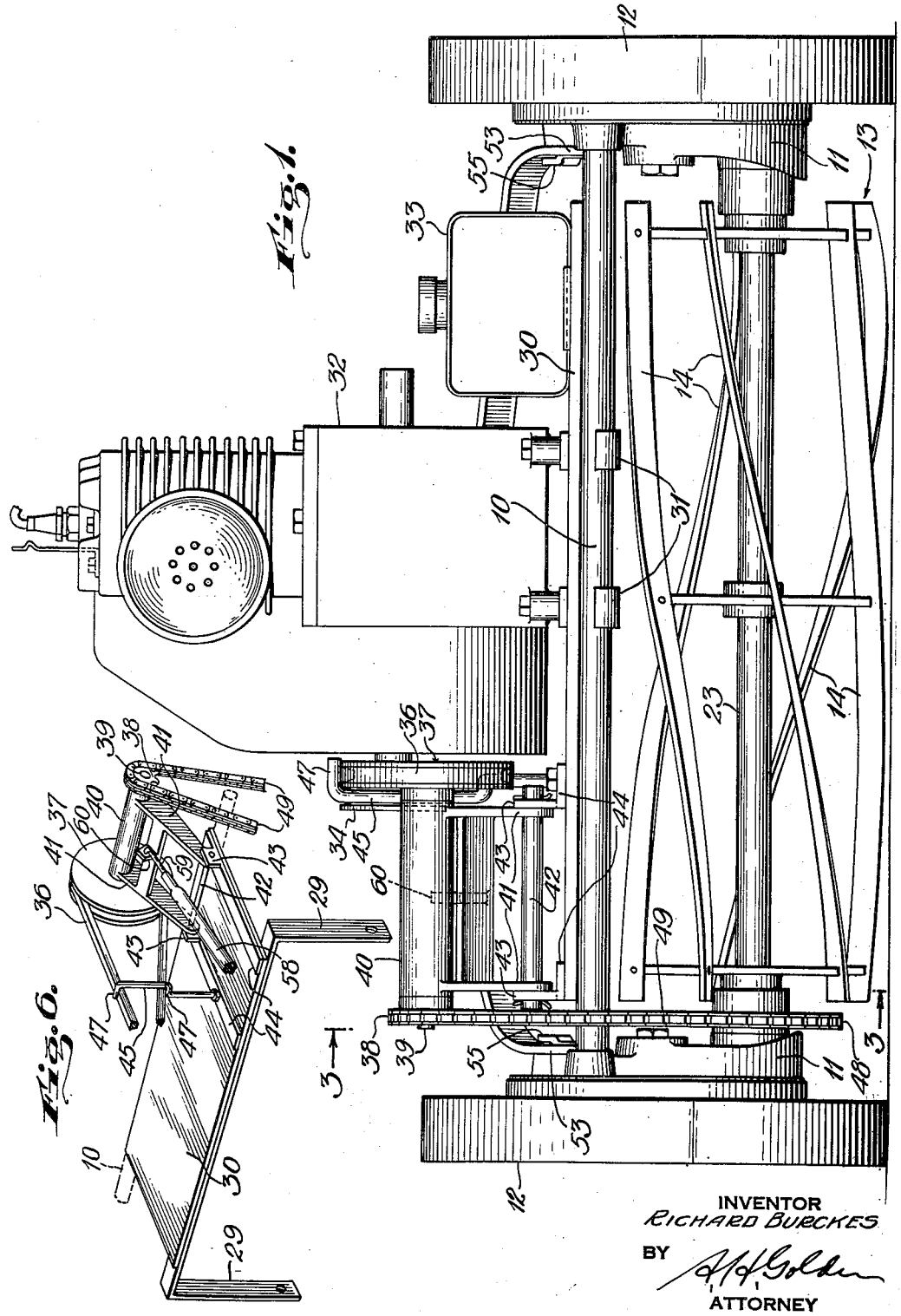
Figure 2:
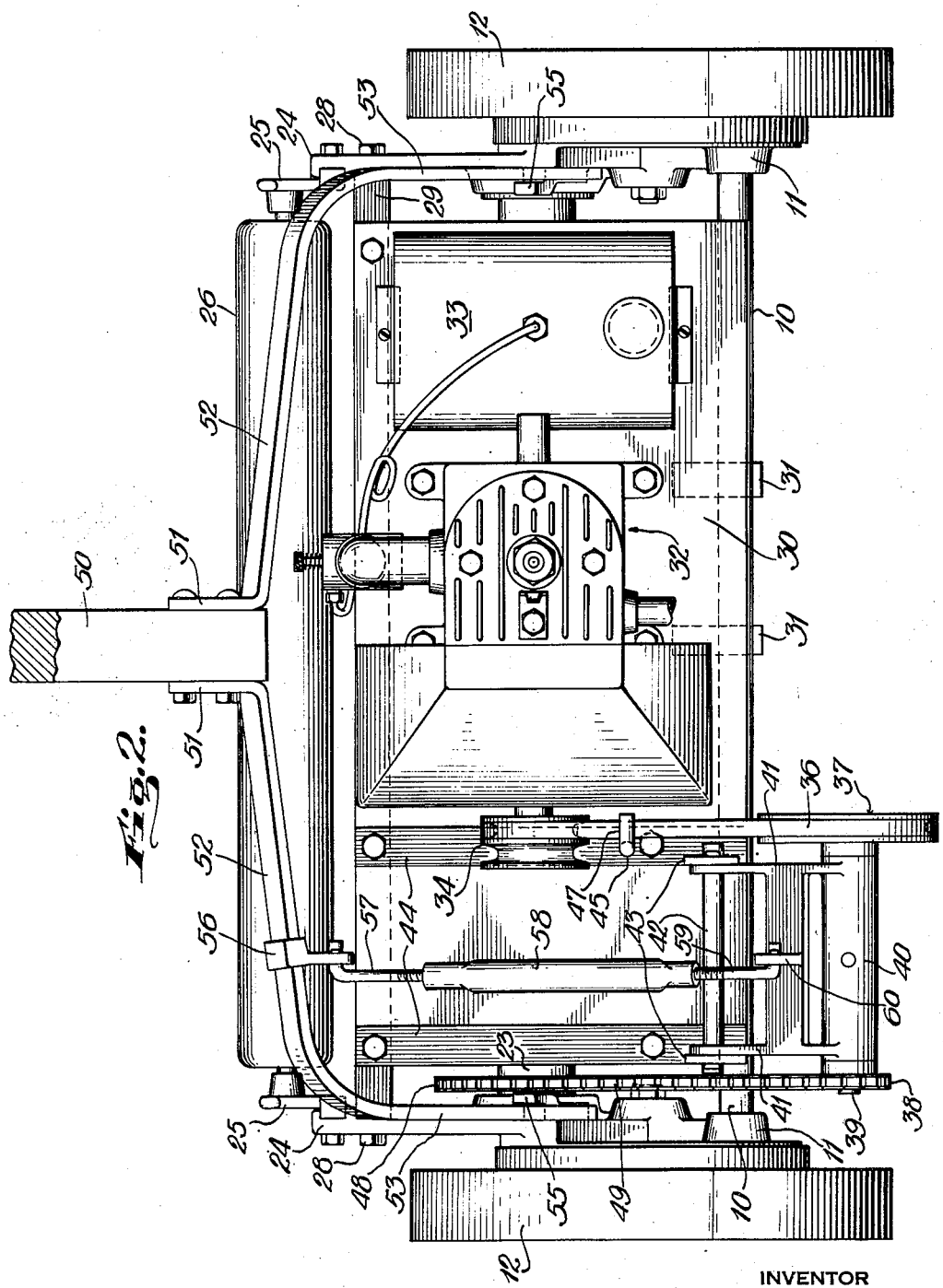

Referring now to the drawings, Fig. 1 is a front view of my lawn mower, while Fig. 2 is a top view looking down on Fig. 1. Fig. 3 is a section taken along lines 3—3 of Fig. 1. Fig. 4 is a section along lines 4—4 of Fig. 3, while Fig. 5 is a section along lines 5—5 of Fig. 4. Fig. 6 is a perspective view of certain important portions of my invention, and best illustrates certain important operations thereof.

Referring now more particularly to the drawings, and especially to Figs. 1, 2 and 3, reference numeral 10 indicates a main tie rod connecting end castings 11 on which are mounted the usual traction wheels 12 and the driving mechanism whereby the movement of the traction wheels 12 drives the cutting reel 13 equipped with cutting blades 14.

The driving mechanism is best illustrated in Figs. 4 and 5, wherein one of the traction wheels 12 is shown as formed with a series of internal teeth 15, whereby it drives a gear 16, which gear 16 in turn drives a pinion 17 rotatable about a shaft 18. The pinion 17 has a series of internal ratchet portions 19 cooperable with a pawl 20 movable in a slot 21 in the shaft 18. It is quite obvious that should the pinion 17 rotate in one direction, it coacts with the pawl 20 for rotating the shaft 18 in a direction reverse to the direction of arrow 22 in Fig. 5. Rotation of the pinion in a reverse direction simply moves the pawl 20 backward and forward in its slot 21 and causes no motion of the shaft 18.

Through this action, rotation of the traction wheels 12 of a hand propelled lawn mower, as when the lawn mower is moved forwardly, rotates the shaft 18, which shaft forms a continuation of the main shaft 23 of the cutting reel 13, and thus rotates the cutting reel 13 to cut the grass.

In utilizing a standard lawn mower for my purpose, I reverse the pawl 20 from its usual position and utilize the pawl 20 for driving the pinion 17 through rotation of the reel shaft 23, and therefore the shaft 18. This is illustrated in Fig. 5 wherein arrow 22 shows the direction in which pawl 20 drives pinion 17. In other words, I reverse the normal action of a hand power lawn mower by having the cutting reel 13 through shafts 23 and 18 drive the traction wheels 12 as the reel moves in a cutting direction. This allows free backward movement of the traction wheels, which backward movement is necessary for the proper manipulation of the lawn mower. Those skilled in the art will readily appreciate the tremendous savings which are made by so adapting a standard hand power lawn mower for power use.

Secured to each of the end castings 11 are bracket portions 24 to which are secured further brackets 25 for supporting a standard wood roller 26 in a manner well known in the art. This is of course standard practice in lawn mowers. Furthermore, portions of the brackets 24 support the cutting blade 27 for cooperation with the cutting reel 13. This also is standard in any hand lawn mower.

Secured to each of the brackets 25 through a bolt and nut combination 28 is a structural steel upright 29. The two structural steel uprights 29 in turn support between themselves a steel platform member 30 in any suitable way, as is probably best illustrated in Figs. 3 and 6. The side of the platform 30 opposite the two structural uprights 29 is supported through brackets 31 on the main tie rod 10 of the lawn mower, this being the tie rod which connects the two end castings 11, as previously described.

The platform 30 lies in a substantially horizontal plane and has secured thereto by suitable bolts a small gas engine 32 of a type manufactured commercially in large quantities. It has also secured thereto a small gasoline tank 33 which is connected to the gas engine 32, all as will be quite clear to those skilled in the art. The gas engine 32 is equipped with a driving pulley 34 and a further starting pulley notched at 35 whereby it may be started. I utilize the pulley 34 to drive a belt 36, which belt in turn drives a power pulley 37, which in turn drives a sprocket 38, the pulley 37 and the sprocket 38 being mounted at opposite ends of a shaft 39.

The shaft 39, as best illustrated in Figs. 3 and 6, is mounted in a bearing sleeve 40 secured to a pair of brackets 41, which are in turn pivoted on a shaft 42 carried by lugs 43 formed on metal strips 44 secured to the platform 30. Supported also on one of the strips 44 is a guide member 45 which is adapted to confine the belt 36 within the limits of the horizontal portions 47 of the said guide member, for a purpose to be described below.

A sprocket 48 is secured to one end of the main shaft 23 of my cutting reel 13 and a chain 49 connects the power sprocket 38 to the sprocket 48, whereby rotation of the sprocket 38 rotates the cutting reel 13. It will now be clear that as the gas engine 32 rotates the pulley 34, the belt 36 will impart power from pulley 34 to power pulley 37, this in turn rotating shaft 39 and sprocket 38 and driving chain 49, which in turn rotates the sprocket 48 and drives the cutting reel 13. The rotation of the cutting reel in a cutting direction in turn rotates the traction wheels through pawl 20 and moves the lawn mower over the ground.

Those skilled in the art will appreciate that it is necessary to control the transmission of power from the gas engine 32 to the cutting reel. This I prefer to do in a manner which is extremely simple, utilizing nothing more than the standard handle of a hand operated lawn mower, that is, the handle 50 best illustrated in Figs. 2 and 3. This handle 50 has secured thereto at points 51, brackets having horizontal portions 52 terminating in longitudinal portions 53 which are pivoted at 54 on lugs 55 carried by each of the end castings 11.

Secured to one of the horizontal bracket portions 52 is a clamp 56 to which in turn is secured a rod 57 forming part of an adjustable turnbuckle 58. The turnbuckle has a further rod 59 which is linked to an ear 60 secured to the pair of brackets 41 which support the sleeve 40 on which is mounted the shaft 39, as is best seen in Fig. 6. It is therefore seen that as the handle 50 is swung about its support 54, 55 on the castings 11, it swings the brackets 41 about the rod 42, this serving to move the pulley 37 relatively to the pulley 34 so as to increase or decrease the tension in the belt 36. It will be appreciated that with the handle 50 in its extreme downward position of Fig. 3 as limited by its mounting 54, 55, the belt 36 will be quite loose, in fact, too loose to impart movement to pulley 37 from pulley 34. The turnbuckle 58 is, in the position of Fig. 3, adjusted so that the tension in the chain 49 is proper. In this way, the entire weight of the handle in Fig. 3 is carried by the mounting means 54, 55 of the handle rather than by the chain. Also, because of the particular mounting of the shaft 39, the movement of the shaft to change the tension in the belt does not affect the adjustment of the chain 49 and its driving action.

The guide 45 and its portions 47 control the belt 36 so that no power may be transmitted thereby when it is loose, as in Fig. 3. Were it not for the horizontal portions 47, the belt 36, when driven by pulley 34, would be moved outwardly as by centrifugal force, and this outward motion would cause it to have sufficient tension so as to transmit power to the power pulley 37. With the horizontal portions 47 preventing outward movement of the belt 36 under centrifugal force, no power is transmitted from the gas engine 32 to drive the lawn mower when the handle 50 is in its position of Fig. 3. If the handle 50 is moved upwardly a very few degrees from its position of Fig. 3, the pulley 37 is moved away from pulley 34 tightening the belt gradually so that power is gradually applied to drive the lawn mower forward.

I believe the operation of my lawn mower will now be quite clear to those skilled in the art.

I now claim:

1. A lawn mower comprising a pair of traction wheels, a cutting reel, mechanism whereby said reel rotates said traction wheels in one direction while permitting free rearward rotation of said traction wheels, a chain sprocket secured to the said reel, a pivoted bracket supporting a power shaft, a pulley and a power sprocket carried on said shaft forwardly of said cutting reel and traction wheels, a chain connecting said power sprocket to said reel sprocket, a source of power having a pulley rearwardly of said first pulley, a belt connecting said pulley to said first pulley for driving said first pulley and sprocket, a usual type of propelling and guiding handle for said lawn mower pivotally mounted on said lawn mower, a rod fixedly secured at one end to said handle and at the other end to said pivoted bracket whereby downward vertical swinging of said handle moves said bracket to bring said pulleys together whereby to decrease the tension on said belt and to stop the rotation of said first pulley by said belt, while upward swinging of said handle increases the tension of said belt to drive said first pulley, said pivoting movement moving said power sprocket also and on an arc whereby to maintain substantially the same relation between said power sprocket, said chain and the reel sprocket in all positions of said bracket.

2. A lawn mower comprising a pair of traction wheels, a cutting reel, pawl and ratchet mechanism whereby said reel rotates said traction wheels in one direction while permitting free rearward rotation of said traction wheels, a chain sprocket secured to the said reel, means forming a power platform for said lawn mower, a bracket pivotally mounted on said power platform and supporting a power shaft, a pulley and a power sprocket carried on said shaft forwardly of said cutting reel and traction wheels, a chain connecting said power sprocket to said reel sprocket, a power motor also supported on said power platform and having a pulley rearwardly of said first pulley, a belt connecting said pulley to said first pulley for driving said first pulley and sprocket, a usual type of propelling and guiding handle for said lawn mower having a main shaft portion and metal horizontally extending portions extending at either side therefrom and terminating in bracket-like parts pivoted to the frame of said lawn mower, a rod secured at one end to said power shaft supporting bracket and at the other end to one of said horizontally extending metal handle portions whereby downward swinging of said handle moves said bracket to bring said pulleys together whereby to decrease the tension on said belt and to stop the rotation of said first pulley by said belt, said pivoting movement moving said power sprocket also and on an arc whereby to maintain substantially the same relation between said power sprocket, said chain and the reel sprocket in all positions of said bracket.

RICHARD BURCKES.